May 31, 1949.　　　M. J. MANNING ET AL　　　2,471,881
PORTABLE WELDING DEVICE

Filed July 14, 1948

INVENTORS
Matthew J. Manning
Paul F. Eisen.
BY Maurice A. Crews
ATTORNEY

May 31, 1949.  M. J. MANNING ET AL  2,471,881
PORTABLE WELDING DEVICE
Filed July 14, 1948   2 Sheets-Sheet 2
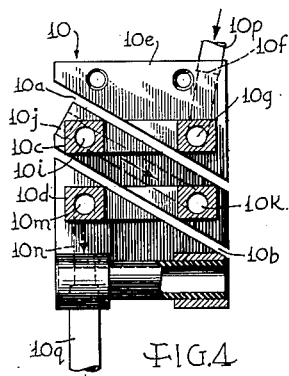
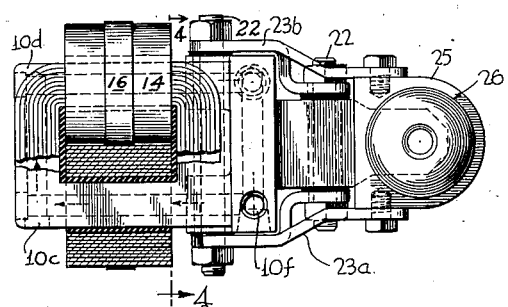
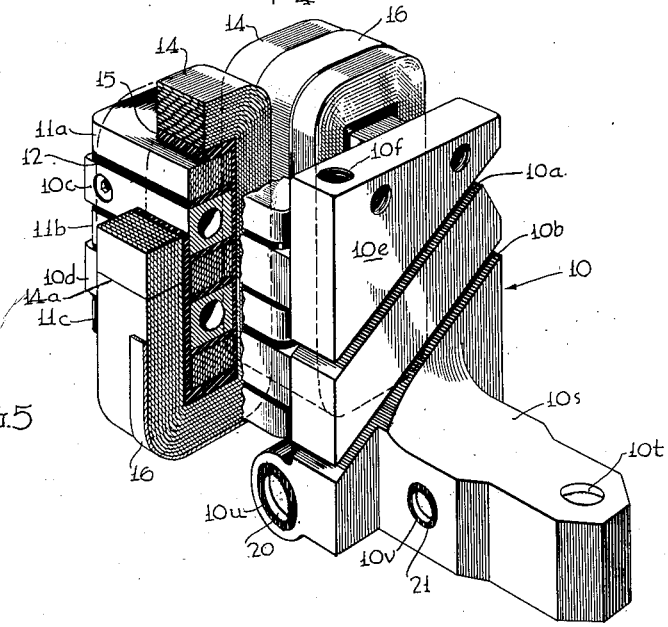
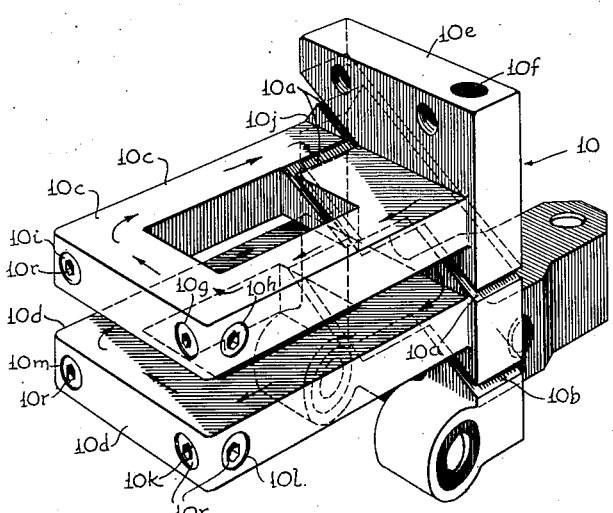
INVENTORS
Matthew J. Manning
Paul F. Eisen.
BY
Maurice A. Crews
ATTORNEY Patented May 31, 1949

2,471,881

UNITED STATES PATENT OFFICE 2,471,881

PORTABLE WELDING DEVICE

Matthew J. Manning and Paul F. Eisen, Detroit, Mich., assignors to The Budd Company, Philadelphia, Pa., a corporation of Pennsylvania Application July 14, 1948, Serial No. 38,603

6 Claims. (Cl. 219—4)

This invention relates to portable welding devices and has for an object the provision of a strong, compact and light welding tool which can be used in places which have heretofore been very difficult to reach.

More particularly, it is an object of the invention to provide an improved built-in transformer and frame assembly which will be very strong and small and very easy to manufacture.

The above and other objects and advantages of the invention will be apparent from the following description of an illustrative embodiment of the invention, reference being made to the accompanying drawings, wherein:

Figure 3 is a top plan view;

Figure 4 is a section taken on the line 4—4 of Fig. 3;

Figure 5 is a side perspective view of the transformer assembly, some parts being shown in section; and Figure 6 is a side perspective view of the transformer secondary.

Figure 1:
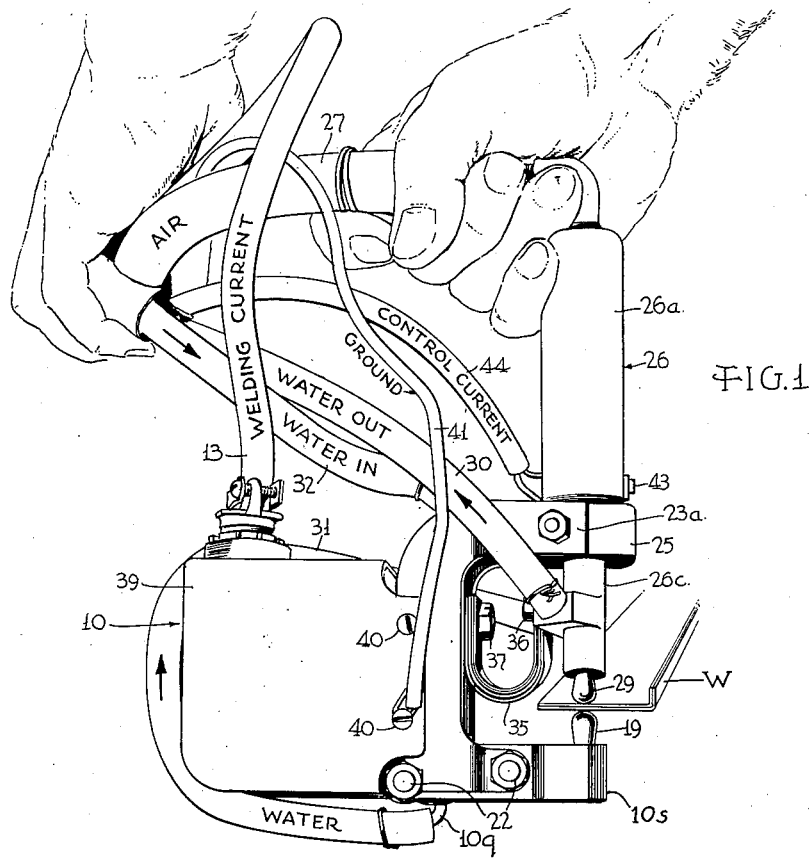
Figure 1 is a perspective side view of a welding gun embodying the invention.

The present device, as best shown in Figs. 4-6, is characterized by the fact that the entire assembly is based upon a substantial transformer secondary 10 which is formed as a brass or bronze casting which is slitted as at 10a, 10b to cause the arm loops 10c, 10d to form a two-turn transformer secondary coil carried by the base portion 10e. By drilling (if not cored) a number of holes 10f, 10g, 10h, 10i, 10j, 10k, 10l, 10m, 10n, providing nipples 10p and 10q for the terminal holes 10f, 10n, and by providing plugs 10r for the outer ends of the other holes, a continuous channel for coolant fluid circulation is provided in the secondary.

The primary coils 11a, 11b, 11c are, with suitable insulation 12, inserted between the spaced arm loops 10c, 10d and are supplied with current, preferably at relatively high frequency of a few hundred cycles, by an electrical cable 13. Laminated cores 14, split at 14a for installation, and separated from adjacent metal parts by insulation 15, are secured in place by binding bands 16.

Figure 2:
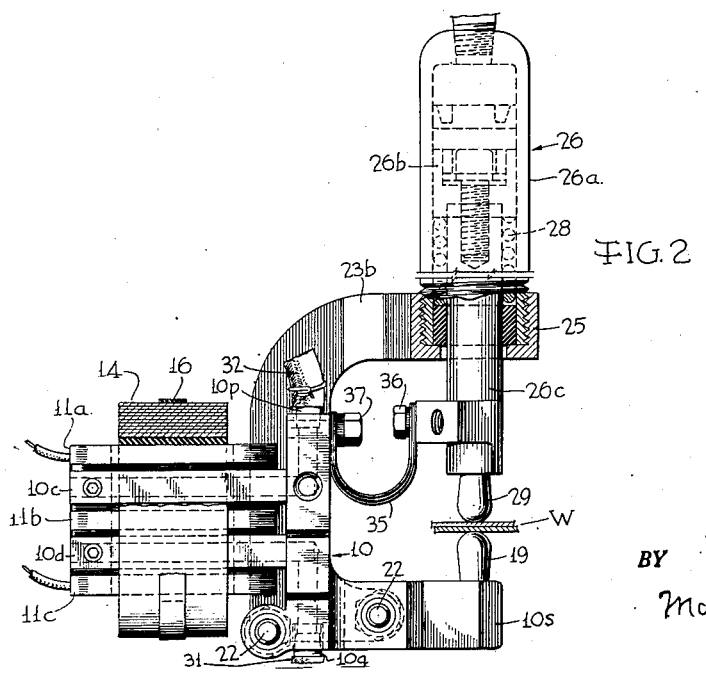
Figure 2 is a side elevation with some parts in section.

To the bottom portion 10d of the secondary, specifically to the base end portion 10e of the secondary loop, there is secured, as by being made integral, an extension 10s having a hole 10t which is adapted to carry a welding electrode 19. The base portion 10e and the extension 10s are respectively provided with anchorage holes 10u and 10v having insulating bushings 20 and 21 for bolts 22 which, as shown in Figs. 1-3, secure spaced yoke plates 23a, 23b to the secondary base.

To the spaced upper arms of the yoke plates there is secured a cross member 25 upon which is mounted a reciprocating motor 26, comprising a cylinder 26a, a piston 26b, and a piston rod 26c. Air from a hose 27 moves in and out of the upper end of the cylinder and a spring 28 returns the piston to upper position. For lightness and long life the piston is preferably made of a plastic. The piston rod is bored at the end to take an electrode 29 and is cored and nippled for connection of coolant fluid hoses 30 and 31. A supply hose 32 for coolant fluid to the nipple 10p is also shown in Fig. 1. The hose 31 connects the cooling fluid space of the upper electrode piston rod 26c to the lower nipple 10q of the transformer secondary. The workpiece W to be welded is shown between the electrodes 19 and 29.

The piston rod 26c, which preferably is made of copper, at least in the lower end portion where it serves as an electrode support, is connected electrically with the upper end of the transformer secondary coil by a flexible conductor bus 35, preferably formed of laminated copper sheets, the conductor 35 being secured to the piston rod by bolts 36 and to the secondary by bolts 37. The lower end of the secondary needs no connection, the extension 10s being formed integral therewith.

The transformer is covered for protection by a casing 39 which is secured by screws 40 and grounded by a conductor 41.

A starter switch 43 is provided on the welder, this being connected by a cable 44 to the general controls at a convenient fixed location. The general controls execute one welding operation by applying electrode pressure, applying electrode current, timing the operation and finally cutting off the current and pressure. The electrodes separate when air pressure is relieved from the cylinder 26a by the action of the return spring 28.

It will be seen that by using current of higher than commercial 60 cycle frequency, it is possible to have a very small light transformer and to have this mounted with the welding gun unit to avoid losses which would be entailed by the use of interconnecting leads. Current of 180 cycles has been used successfully but, of course, may be varied to suit the generating equipment available.

It is also seen that the transformer secondary forms the frame for the entire unit and that the secondary itself is of a simple shape which can conveniently be formed by slitting and coring a simple casting. With somewhat more effort the secondary may be cast complete with slits and cores but with copper it is less desirable to make cored and complex shapes than with some other materials, such as brasses and bronzes. Copper is best for electrical purposes. The cores and primaries are easily installed with this type of secondary.

The yoke is very conveniently installed and may be readily exchanged for different types of yokes for other types of work to be done by the welding gun. Different throat shapes and sizes and different angles of weld can readily be obtained with the same transformer, that being the more complex and expensive part of welding gun assemblies.

While one embodiment of the invention has been specifically described, it is to be understood that there may be other embodiments within the limits of the invention.

What is claimed is:

1. A portable welding device comprising in combination, a transformer including a secondary having a base portion and a loop extending transversely therefrom on one side, and a welding unit mounted on said secondary base portion on the side opposite said loop.

2. A portable welding device comprising in combination, a transformer including a secondary having a slitted base portion and a plurality of loops extending transversely therefrom on one side, and a welding unit mounted on said secondary base portion on the side opposite said loops.

3. A portable welding device comprising in combination, a transformer including a secondary having an obliquely slitted base portion and flat parallel loops extending transversely therefrom on one side, said base and loops having a continuous fluid channel therein with connections to said base portion, and a welding unit mounted on said secondary base portion on the side opposite said loops.

4. A portable welding device comprising in combination, a transformer including a secondary having a base portion and one or more loops extending transversely therefrom on one side, said base portion having an electrode support extending therefrom on the side away from the loop, yoke means secured to the side edges of the base portion at said electrode support, and a welding unit including an electrode and means for operating it carried by said yoke means.

5. A portable welding device, comprising in combination, a transformer including a secondary having an obliquely slitted base portion and a plurality of integral parallel flat loops extending transversely therefrom on one side with the legs of each loop straddling a slit, the base and loops being drilled and plugged to form a continuous passage for cooling fluid therethrough, means connected to the base to flow cooling fluid therethrough, an integral electrode support extending from said base portion on the side opposite said loops, yoke plates secured to the side edges of said base portion in the region of said support, and a welding unit including an electrode and means for operating it mounted between said yoke plates.

6. A portable welding device, comprising in combination, a transformer including a secondary having a base portion formed with two vertically spaced oblique slits across its width and two vertically spaced integral flat parallel secondary loops extending transversely therefrom one one side with the legs of each loop straddling a slit, the base and loops being cored to form a continuous passage for cooling fluid therethrough, fluid inlet and outlet connections at the top and bottom of said base, flat transformer primary loops on each side of and between said secondary loops, split core loops bound on the side legs of the primary and secondary loops, an integral electrode support extending from the bottom of the base portion on the side opposite said loops, an electrode carried by said support and extending upward, yoke plates secured to the side edges of said base portion and insulated therefrom, a cylinder carrying a piston with a second electrode mounted between said yoke plates, and a flexible bus connected between the top front of said base and said plunger.

MATTHEW J. MANNING.
PAUL F. EISEN.

REFERENCES CITED

The following references are of record in the file of this patent:

UNITED STATES PATENTS

| Number | Name | Date |
| --- | --- | --- |
| 452,042 | Ries | May 12, 1891 |
| 1,084,083 | Gravell | Jan. 13, 1914 |
| 1,086,041 | Gravell | Feb. 3, 1914 |
| 1,086,042 | Gravell | Feb. 3, 1914 |
| 1,779,365 | Von Henke | Oct. 21, 1930 |
| 2,236,162 | Von Henke | Mar. 25, 1941 |
| 2,269,726 | Martin | Jan. 13, 1942 |
| 2,318,023 | Strickland | May 4, 1943 |
| 2,349,835 | Strickland | May 30, 1944 |
| 2,426,280 | Nichols | Aug. 26, 1947 |